(12) United States Patent
Al-Nakhli et al.

(10) Patent No.: US 10,961,833 B2
(45) Date of Patent: *Mar. 30, 2021

(54) SANDSTONE STIMULATION USING IN-SITU MUD ACID GENERATION

(71) Applicant: Saudi Arabian Oil Company, Dhahran (SA)

(72) Inventors: Ayman R. Al-Nakhli, Dammam (SA); Amy J. Cairns, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/412,962

(22) Filed: May 15, 2019

(65) Prior Publication Data

US 2020/0362679 A1 Nov. 19, 2020

(51) Int. Cl.
*E21B 43/25* (2006.01)
*C09K 8/66* (2006.01)
*C09K 8/72* (2006.01)
*E21B 43/26* (2006.01)

(52) U.S. Cl.
CPC ............ *E21B 43/255* (2013.01); *C09K 8/665* (2013.01); *C09K 8/72* (2013.01); *E21B 43/26* (2013.01)

(58) Field of Classification Search
CPC ....... E21B 43/255; E21B 43/26; C09K 8/665; C09K 8/72
See application file for complete search history.

(56) References Cited

U.S. PATENT DOCUMENTS 4,232,741 A 11/1980 Richardson et al.
4,737,296 A 4/1988 Watkins
(Continued)

FOREIGN PATENT DOCUMENTS

CN 108690595 A 10/2018
RU 2197606 C1 1/2003
(Continued)

OTHER PUBLICATIONS

International Search Report and Written Opinion dated Mar. 31, 2020 pertaining to International application No. PCT/US2019/056708 filed Oct. 17, 2019, 13 pgs.
Office Action dated Mar. 12, 2020 pertaining to U.S. Appl. No. 16/520,887, filed Jul. 24, 2020, 24 pgs.
Davies et al., "Carbonate Stimulation", Middle East & Asia Reservoir Review, 2007, 7 pgs.
Al-Nakhli et al., "Chemically-Induced Pressure Pulse: A Novel Fracturing Technology for Unconventional Reservoirs", Society of Petroleum Engineers, 2015, 14 pgs.
(Continued)

*Primary Examiner* — Silvana C Runyan
(74) *Attorney, Agent, or Firm* — Dinsmore & Shohl LLP

(57) ABSTRACT

A method for stimulating production of hydrocarbons from a sandstone formation includes the steps of injecting a stimulation fluid into the sandstone formation, the stimulation fluid formed from a hydrofluoric acid precursor and an oxidizer; injecting an ammonium containing compound into the sandstone formation; and injecting a nitrite containing compound into the sandstone formation. The method further includes maintaining the stimulation fluid, the ammonium containing compound, and the nitrite containing compound in the sandstone formation to initiate reaction of the ammonium containing compound and the nitrite containing compound to generate heat and nitrogen gas, where upon generation of heat within the formation the hydrofluoric acid precursor and the oxidizer react to form hydrofluoric acid in-situ to dissolve silica and silicate minerals and stimulate the sandstone formation. A treatment fluid for use in stimulating sandstone formations includes the stimulation fluid, the ammonium containing compound, and the nitrite containing compound.

16 Claims, 4 Drawing Sheets

(56) References Cited

U.S. PATENT DOCUMENTS

| | | | |
|---|---|---|---|
| 4,846,277 | A | 7/1989 | Khalil et al. |
| 7,148,184 | B2 | 12/2006 | Francini et al. |
| 7,464,754 | B1 | 12/2008 | Decker et al. |
| 9,701,894 | B2 | 7/2017 | Al-Nakhli et al. |
| 2004/0177960 | A1* | 9/2004 | Chan .................. E21B 43/267 166/280.1 |
| 2007/0235189 | A1* | 10/2007 | Milne .................. C09K 8/74 166/280.1 |
| 2009/0281005 | A1 | 11/2009 | Qu et al. |
| 2013/0126169 | A1 | 5/2013 | Al-Nakhli et al. |
| 2013/0180720 | A1 | 7/2013 | Al-Dahlan et al. |
| 2015/0000912 | A1 | 1/2015 | Choudhary et al. |
| 2015/0300143 | A1 | 10/2015 | Al-Nakhli et al. |
| 2015/0361328 | A1 | 12/2015 | Almutairi |
| 2016/0265326 | A1 | 9/2016 | Nguyen et al. |
| 2016/0319182 | A1 | 11/2016 | Al-Nakhli et al. |
| 2017/0145303 | A1 | 5/2017 | Fontenelle et al. |
| 2018/0291720 | A1 | 10/2018 | Cairns et al. |

FOREIGN PATENT DOCUMENTS

| | | |
|---|---|---|
| WO | 2013109768 A1 | 7/2013 |
| WO | 2013181229 A2 | 12/2013 |
| WO | 2014149524 A1 | 9/2014 |
| WO | 2017058193 A1 | 4/2017 |
| WO | 2018187565 A1 | 10/2018 |

OTHER PUBLICATIONS

Al-Nakhli et al., "Overcoming Unconventional Gas Challenges by Creating Synthetic Sweetspot and Increasing Drainage Area", Society of Petroleum Engineers, 2013, 15 pgs.

Nguygen et al., "Kinetics and mechanism of the reaction between ammonium and nitrite ions: experimental and theoretical studies", Chemical Engineering Scient 58 (2003) 4351-4362, 12 pgs.

Glasbergen et al., "Injectivity Loss in Polymer Floods: Causes, Preventions and Mitigations", Society of Petroleum Engineers, 2015, 15 pgs.

Yerramilli et al., "Novel Insight into Polymer Infectivity for Polymer Flooding", Society of Petroleum Engineers, 2013, 23 pgs.

Farajzadeh et al., "Simultaneous Sorption and Mechanical Entrapment During Polymer Flow Through Porous Media", Society of Petroleum Engineers, 2015, 24 pgs.

Sanchez et al., "Acid Fracturing Tight Gas Carbonates Reservoirs Using CO2 to Assist Stimulation Fluids: An Alternative to Less Water Consumption while Maintaining Productivity", Society of Petroleum Engineers, 2015, 13 pgs.

Office Action dated Dec. 26, 2019 pertaining to U.S. Appl. No. 16/520,907, filed Jul. 24, 2019, 20 pgs.

International Search Report and Written Opinion dated Jul. 20, 2020 pertaining to International application No. PCT/US2020/030353, filed Apr. 29, 2020, 13 pgs.

International Search Report and Written Opinion dated Aug. 5, 2020 pertaining to International application No PCT/US2020/032064, filed May 8, 2020, 13 pgs.

International Search Report and Written Opinion dated Jul. 16, 2020 pertaining to International application No. PCT/US2020/024150, filed Mar. 23, 2020, 13 pgs.

Office Action dated Jun. 24, 2020 pertaining to U.S. Appl. No. 16/520,907, filed Jul. 24, 2019, 26 pgs.

Office Action dated Jun. 29, 2020 pertaining to U.S. Appl. No. 16/520,887, filed Jul. 24, 2019, 16 pgs.

Office Action dated Jul. 27, 2020 pertaining to U.S. Appl. No. 16/851,589, filed Apr. 17, 2020, 25 pgs.

Notice of Allowance and Fee(s) Due dated Oct. 23, 2020 pertaining to U.S. Appl. No. 16/520,887, filed Jul. 24, 2019, 8 pgs.

* cited by examiner

SANDSTONE STIMULATION USING IN-SITU MUD ACID GENERATION

TECHNICAL FIELD

Embodiments of the present specification generally relate to stimulating production of hydrocarbons from a sandstone formation, including liquid and gas wells.

BACKGROUND

Reserves trapped within certain low permeability formations, such as certain sandstone and carbonate formations, exhibit little or no production, and thus may be economically undesirable to develop. Well stimulation is one method that may be employed to increase the net permeability of a formation or reservoir, thereby leading to increased production from these wells that have little or no natural production.

During well stimulation operations, chemicals can be injected into the formation in a process known as well stimulation. Some stimulation techniques include: (1) injection of chemicals into the wellbore where the chemicals react with or dissolve production limiting conditions such as clays and drilling solids; (2) injection of chemicals through the wellbore and into the formation to react with or dissolve portions of the formation, thereby creating alternative flow paths for recoverable hydrocarbons, such as with acid-fracturing or matrix-fracturing processes; and (3) injection of water or chemicals through the wellbore and into the formation at pressures that are sufficient to fracture the formation, thereby creating new or additional flow channels through which hydrocarbons can more readily move from the formation into the wellbore.

Sandstone and carbonate formations can be particularly susceptible to formation damage from formation minerals such as clay and other siliceous deposits. Stimulation methods for these types of formations have typically employed acid or acid-based fluids for the treatment or stimulation due to the ability of the acid or acid-based fluid to readily dissolve both formation minerals and contaminants introduced into the wellbore/formation during drilling or remedial operations. The known prior art techniques typically involve acids, often concentrated acids such as hydrofluoric acid (HF) and HCl—HF acid mixtures, which are both corrosive and can create dangerous operating conditions and formation damage. Further, in many instances, the reaction of the acid with the formation is rapid, frequently instantaneous, which limits the penetration depth of the acid.

SUMMARY

Accordingly, additional needs exist for the ability to enhance production from an unconventional formation, such as a low permeability formation like a tight gas formation. Specifically, methods and compositions that are available for reaction deep within the formation and which readily remove precipitants formed in the sandstone formation during reaction between the acid and the formation minerals.

According to one embodiment, a method for stimulating production of hydrocarbons from a sandstone formation is provided. The method includes injecting a stimulation fluid into the sandstone formation, the stimulation fluid formed from a hydrofluoric acid precursor and an oxidizer. The method also includes injecting an ammonium containing compound into the sandstone formation and injecting a nitrite containing compound into the sandstone formation. Additionally, the method includes maintaining the stimulation fluid, the ammonium containing compound, and the nitrite containing compound in the sandstone formation. Maintaining the stimulation fluid, the ammonium containing compound, and the nitrite containing compound in the sandstone formation initiates reaction of the ammonium containing compound and the nitrite containing compound to generate heat and nitrogen gas, where upon generation of heat within the formation, the hydrofluoric acid precursor and the oxidizer react to form hydrofluoric acid within the sandstone formation. Finally, silica and silicate minerals are dissolved with the hydrofluoric acid to stimulate the sandstone formation.

According to another embodiment, a treatment fluid for use in stimulating sandstone formations is provided. The treatment fluid includes an ammonium containing compound, a nitrite containing compound, and a stimulation fluid. The stimulation fluid is formed from a hydrofluoric acid precursor and an oxidizer. Further, the ammonium containing compound and the nitrite containing compound are operable to react and generate heat and nitrogen gas and the hydrofluoric acid precursor and the oxidizer are operable to react to form hydrofluoric acid.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

DETAILED DESCRIPTION

Figure 1:
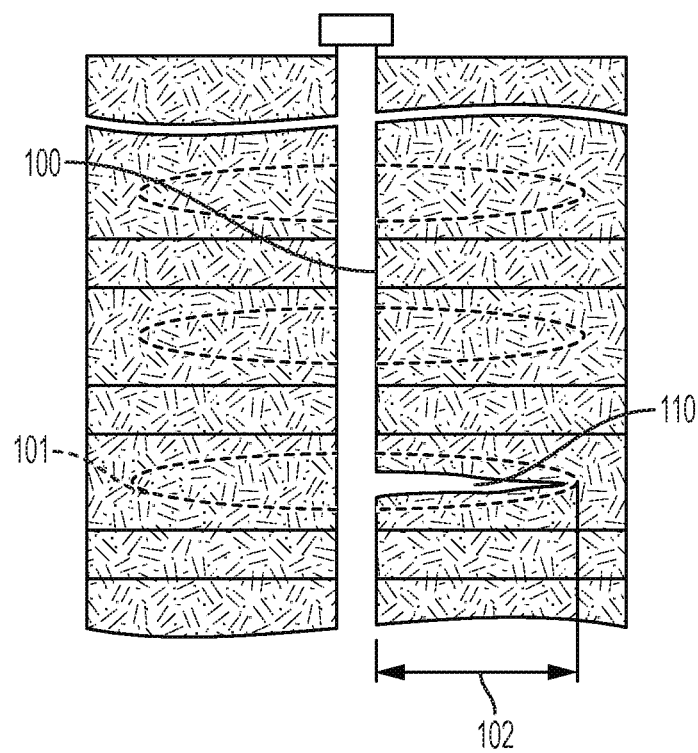
FIG. 1 is a schematic drawing of a wellbore used for hydraulic fracturing operations.

Reference will now be made in detail to embodiments of a method for stimulating production of hydrocarbons from a sandstone formation.

As used in this disclosure, "sandstone" refers to any formation primarily composed of silica, silicate minerals and various forms of feldspar and days. The grains of sandstone rock are traditionally sand-sized.

Provided in this disclosure are methods and compositions for the stimulation of sandstone formations to increase well productivity. The methods and compositions can, in certain embodiments, be utilized in conjunction with standard hydraulic fracturing techniques. For example, the well stimulation process can involve standard hydraulic fracturing techniques to initiate and propagate a hydraulic fracture in the referenced formation followed by introduction of the treatment fluid of the present disclosure.

The present disclosure includes a method for stimulating production of hydrocarbons from a sandstone formation. The method includes injecting an ammonium containing compound, a nitrite containing compound, and a stimulation fluid into the sandstone formation. The stimulation fluid comprises a hydrofluoric acid precursor and an oxidizer. The method further includes maintaining the stimulation fluid, the ammonium containing compound, and the nitrite containing compound in the sandstone formation to initiate reaction of the ammonium containing compound and the nitrite containing compound to generate heat and nitrogen gas, where upon generation of heat within the formation the hydrofluoric acid precursor and the oxidizer react to form hydrofluoric acid (HF) in-situ. Finally, the in-situ formed hydrofluoric acid dissolves silica and silicate minerals in the sandstone formation to stimulate the sandstone formation.

Having described the general method for generating HF within the sandstone formation and stimulating production of hydrocarbons from the same, attention is directed to the specific chemical constituents of the disclosed reaction mechanism. For each of the embodiments described in this disclosure, example hydrofluoric acid precursors include ammonium fluoride ($NH_4F$) and ammonium bifluoride ($NH_4HF_2$). For each of the embodiments described in this disclosure, an example oxidizer is sodium bromate. For each of the embodiments described in this disclosure, example ammonium containing compound include ammonium hydroxide, ammonium chloride, ammonium bromide, ammonium nitrate, ammonium nitrite, ammonium sulfate, ammonium carbonate, ammonium hydroxide, and urea. For each of the embodiments described in this disclosure, example nitrite containing compound include sodium nitrite, potassium nitrite, and sodium hypochlorite.

Example ammonium containing compound and nitrite containing compound combinations for use in accordance with one or more embodiments of the present disclosure include urea-sodium hypochlorite, urea-sodium nitrite, ammonium hydroxide-sodium hypochlorite, and ammonium chloride-sodium nitrite.

Example oxidizer and hydrofluoric acid precursor combinations for use in accordance with one or more embodiments of the present disclosure include combinations of sodium bromate-ammonium fluoride and hydrochloric acid-ammonium bifluoride.

The combination of the hydrofluoric acid precursor, oxidizer, ammonium containing compound, and nitrite containing compound form a treatment fluid. The components of the treatment fluid are provided to the sandstone formation to generate nitrogen gas, heat, and HF in-situ. In one or more embodiments, the components of the treatment fluid comprise ammonium fluoride ($NH_4F$) as the hydrofluoric acid precursor, sodium bromate ($NaBrO_3$) as the oxidizer, sodium nitrite ($NaNO_2$) as the nitrite containing compound, and ammonium chloride ($NH_4Cl$) as the ammonium containing compound. For clarity and conciseness, Reactions 1 through 3 are described using components of the treatment fluid as delineated in the previous example compositions. However, it should be understood by a person of ordinary skill in the art that compounds of similar class of reactants will generally react in a similar way as the example reaction schemes shown in Reactions 1 through 3.

A reaction between the ammonium containing compound and the nitrite containing compound generates heat and nitrogen gas. An example of such a reaction is provided in Reaction 1.

$$NH_4Cl+NaNO_2 \rightarrow NaCl+2H_2O+N_2(gas)+\Delta H(heat) \quad \text{Reaction 1}$$

In typical usage, Reaction 1 results in generation of about 225 kilocalories (Kcal) of heat per one liter (L) of reactants. Without wishing to be bound by theory, it is believed that the increased temperature and pressure from nitrogen gas generation downhole overcome the tensile strength of the formation, thereby leading to creation of tensile microfractures in the formation. Additionally, the generation of $N_2$ gas in Reaction 1 provides energy to flowback the well and prevents precipitation of any reaction products of HF and sandstone.

A follow-on reaction of the hydrofluoric acid precursor and the oxidizer generates HF in-situ. However, the reaction is endothermic and requires heating of the reactants to at least 300° F. (149.9° C.) to proceed. As such, the heat generated in Reaction 1 provides the thermal energy required to initiate the reaction of the hydrofluoric acid precursor and the oxidizer. An example reaction is provided in Reaction 2.

$$2NH_4F+NaBrO_3+\Delta H(heat) \rightarrow 2HF+NaBr+3H_2O+N_2 \quad \text{Reaction 2}$$

The reactants in the treatment fluid also may undergo an alternate reaction between the ammonium containing compound and the oxidizer. When the ammonium containing compound is ammonium chloride, reaction with the oxidizer generates hydrochloric acid (HCl). The generation of HCl in-situ assists in maintaining an acidic pH at the sandstone formation. The HCl also helps keep the reaction products soluble in the spent treatment fluid. Additionally, the reaction of the ammonium containing compound and the oxidizer generates additional nitrogen gas which is beneficial in providing energy to flowback the well and prevent or remove any precipitation. An example reaction is provided in Reaction 3.

$$2NH_4Cl+NaBrO_3 \rightarrow 2HCl+NaBr+3H_2O+N_2 \quad \text{Reaction 3}$$

In one or more embodiments, ammonium bifluoride ($NH_4HF_2$) may additionally be provided downhole to generate additional HF. The ammonium bifluoride reacts with HCl to generate additional HF downhole in accordance with Reaction 4 provided subsequently. The HCl may be present downhole as a product of Reaction 3. The HCl may also be provided downhole alternatively or additionally as a feed of HCl pumped from the surface.

$$2HCl+NH_4HF_2 \rightarrow NH_4Cl+2HF \quad \text{Reaction 4}$$

When the methods of the present disclosure are utilized during hydraulic fracturing treatments, a synthetic sweet spot can be created, thereby stimulating production and enabling maximum enhancement of gas production. A sweet spot is generally defined in this disclosure as the area within a reservoir that represents the best production or potential for production. FIG. 1 is a schematic drawing of a wellbore used for hydraulic fracturing operations, where a viscous fluid, such as the treatment fluid of the present disclosure, is injected into the wellbore 100 at a flow rate such that pressure is created inside the wellbore to cause fractures 110 in the formation. Generally, the fracture 110 produced during hydraulic fracturing can extend deep into the formation, as shown in the region of hydraulic fracturing 101. For example, as shown in FIG. 1, the fracture 110 is shown to extend into the formation to a fracture length 102. In various embodiments, this fracture length 102 can extend up to 100 meters, up to 50 meters, and up to 25 meters. Additionally, the hydraulic fracturing process can be designed such that the fractures 110 extend outward from the wellbore in multiple directions.

Figures 2, 3:
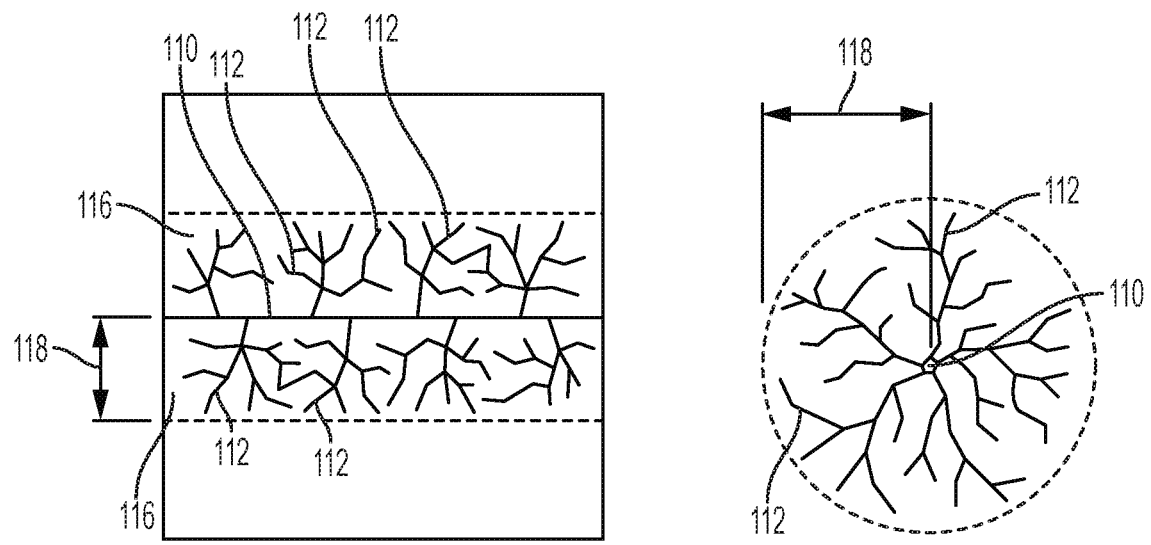
FIG. 2 is a schematic drawing of the propagation of microfractures within and extending from fractures produced as a result of a hydraulic fracturing procedure.
FIG. 3 is a schematic drawing of the end view of FIG. 2.

FIG. 2 shows the propagation of microfractures 112 within and extending from the fractures 110 produced as a result of the hydraulic fracturing procedure, thus creating sweet spots 116. Depending upon the reactants and the volume of nitrogen gas produced therefrom, the microfractures 112 can extend throughout a pseudo fracture width 118 from the fracture 110 created during hydraulic fracturing. The pseudo fracture width 118 represents the penetration depth of the microfractures 112 extending from the fracture 110. FIG. 3 similarly shows an end view of the same. The microfractures 112 may additionally be generated or cleared of formation minerals in sandstone formations with the introduction of the hydrofluoric acid generated in accordance with this disclosure.

Figure 4:
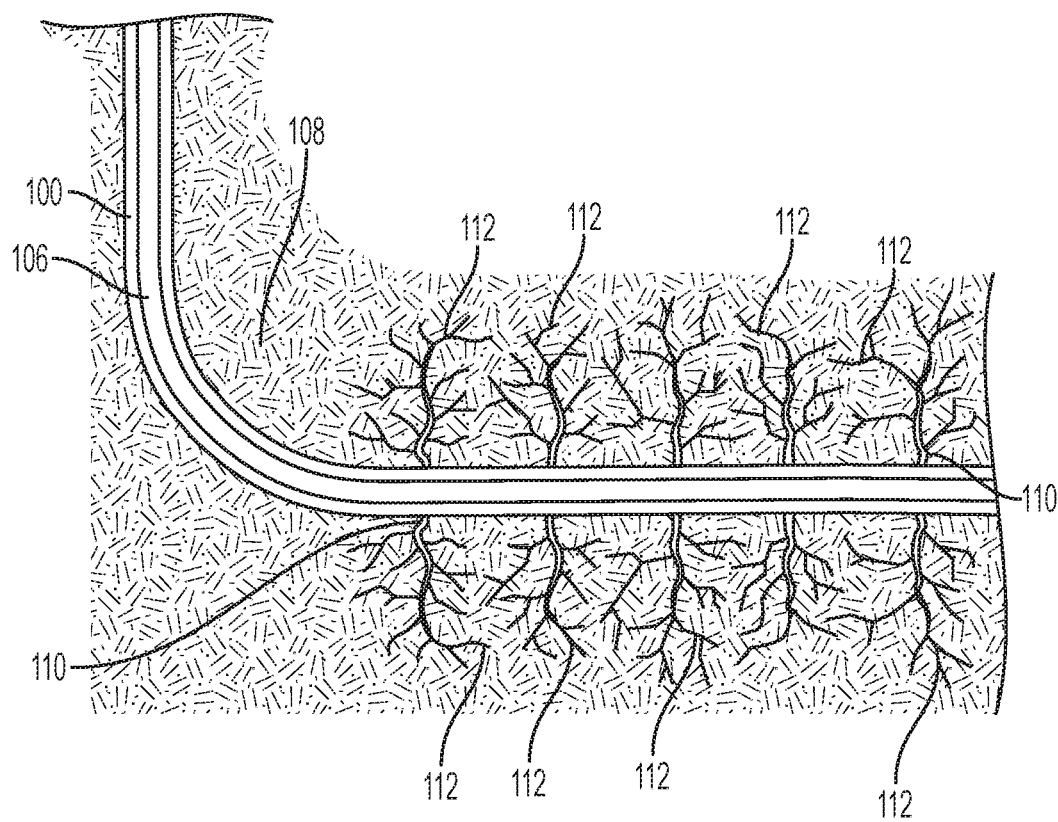
FIG. 4 is a schematic drawing of a sandstone formation subsequent to nitrogen gas creation in accordance with one or more embodiments of the present disclosure.

The release of nitrogen gas within the formation during the hydraulic fracturing operation forms additional microfractures 112 within the formation. With reference to FIG. 4 which provides an illustration of a formation subsequent to nitrogen gas creation, the wellbore 100 is within a sandstone formation 108 and a drill pipe 106 is positioned within the wellbore 100. Following a hydraulic fracturing process, fractures 110 exist within the sandstone formation 108. Acid and nitrogen gas generating fluids, such as the treatment fluid of the present disclosure may be injected into the sandstone formation 108 where it migrates within the fractures 110 before producing nitrogen gas, heat, and hydrofluoric acid. The rapidly expanding nitrogen gas causes the microfractures 112 to be created within the formation. The generated microfractures 112 providing pathways for the hydrocarbons trapped within the formation to migrate and be recovered as well as fluid pathways for stimulation of the sandstone formation 108 with the hydrofluoric acid.

The present disclosure includes a variety of methods to provide the treatment fluid deep into a horizontal well before reaction between the constituent components of the treatment fluid is initiated resulting in generation of HF.

In one or more embodiments, the hydrofluoric acid precursor, the oxidizer, the ammonium containing compound, and the nitrite containing compound are mixed together before being pumped downhole for injection into the sandstone formation as one solution. The treatment solution formed from the hydrofluoric acid precursor, the oxidizer, the ammonium containing compound, and the nitrite containing compound may remain stable until reaching an elevated temperature experienced downhole.

In further embodiments, the components of the treatment solution may be provided to the sandstone formation as two or more separate solutions. Specifically, a first solution comprising the hydrofluoric acid precursor, the oxidizer, and the ammonium containing compound and a second solution comprising the nitrite containing compound may be provided downhole separately. The first solution and the second solution are combined downhole to initiate Reaction 1 between the nitrite containing compound and the ammonium containing compound and the resulting cascade of Reactions 2 and 3. In one or more embodiments, the first solution is provided downhole through a coiled tubing of the drilling string and the second solution is provided downhole through an annulus of the drilling string. In one or more embodiments, the first and second solutions are reversed where the second solution is provided downhole through the coiled tubing of the drilling string and the first solution is provided downhole through the annulus of the drilling string.

In one or more embodiments, the components of the treatment solution may be injected or squeezed into the sandstone formation in a sequential manner. The hydrofluoric acid precursor and the oxidizer may be injected into the sandstone as a first injection and subsequently the nitrite containing compound may be injected into the sandstone formation as a second injection. The ammonium containing compound may be provided as part of the first injection, the second injection, or both injections. For example, $NH_4F$ and $NaBrO_3$ may be squeezed into the sandstone formation and then subsequently $NaNO_2$ and $NH_4Cl$ may be provided downhole and squeezed into the sandstone formation. Similarly, $NH_4F$, $NaBrO_3$, and $NH_4Cl$ may be squeezed into the formation and subsequently only $NaNO_2$ is provided downhole and squeezed into the sandstone formation. It will be appreciated that the order may be reversed such that $NaNO_2$ is initially provided and squeezed into the sandstone formation followed by a solution comprising $NH_4F$, $NaBrO_3$, and $NH_4Cl$.

The location and rate of HF generation may be affected by a variety of process parameters. For example, the pH of the treatment fluid, the downhole temperature and by proxy the temperature of the treatment fluid, and the downhole pressure each affect the reaction rate, the reaction triggering temperature, or both of one or more of the reactions to generate HF downhole.

Figure 5:
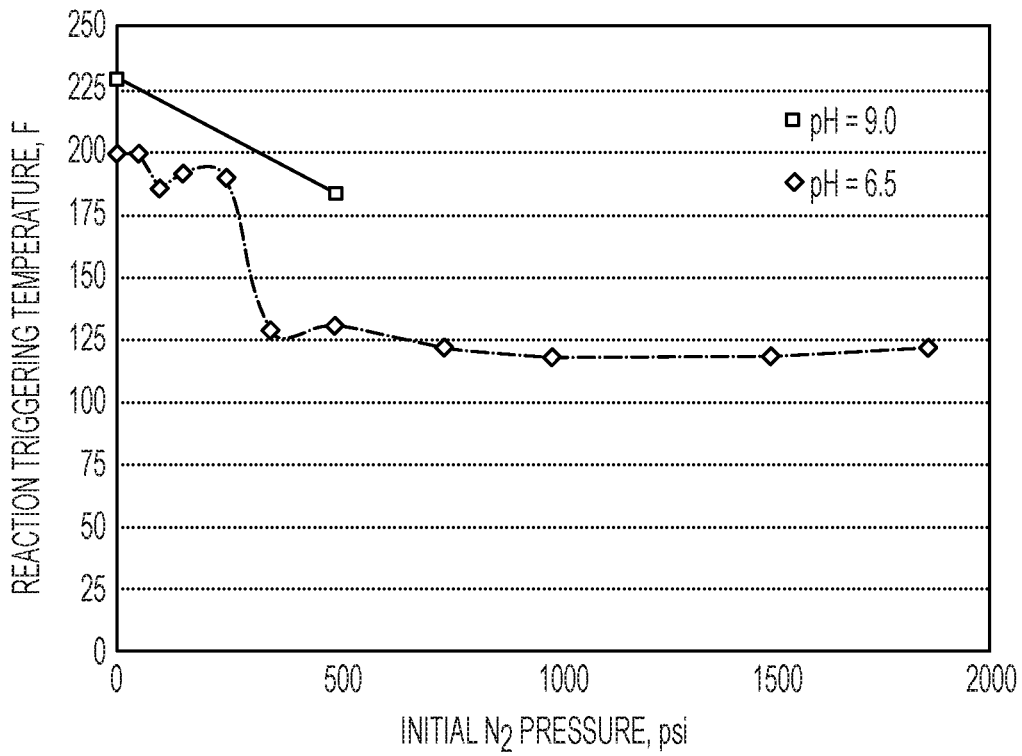
FIG. 5 is a graph showing effect of initial pressure on the reaction initiation temperature.

The downhole pressure at the location of the treatment solution may affect the initiation temperature of Reaction 1. With reference to FIG. 5, the effect of initial pressure on the initiation temperature of Reaction 1 is shown. As the downhole pressure increases the initiation temperature of Reaction 1 generally decreases. However, it will be appreciated that for pressures in excess of approximately 300 pounds per square inch (psi), an increase in pressure does not have a corresponding effect on the initiation temperature of Reaction 1. In various embodiments, the downhole pressure at the reservoir may be 300 to 15000 psi, 500 to 12000 psi, 1000 to 10000 psi, or 3000 to 8000 psi.

Figure 6:
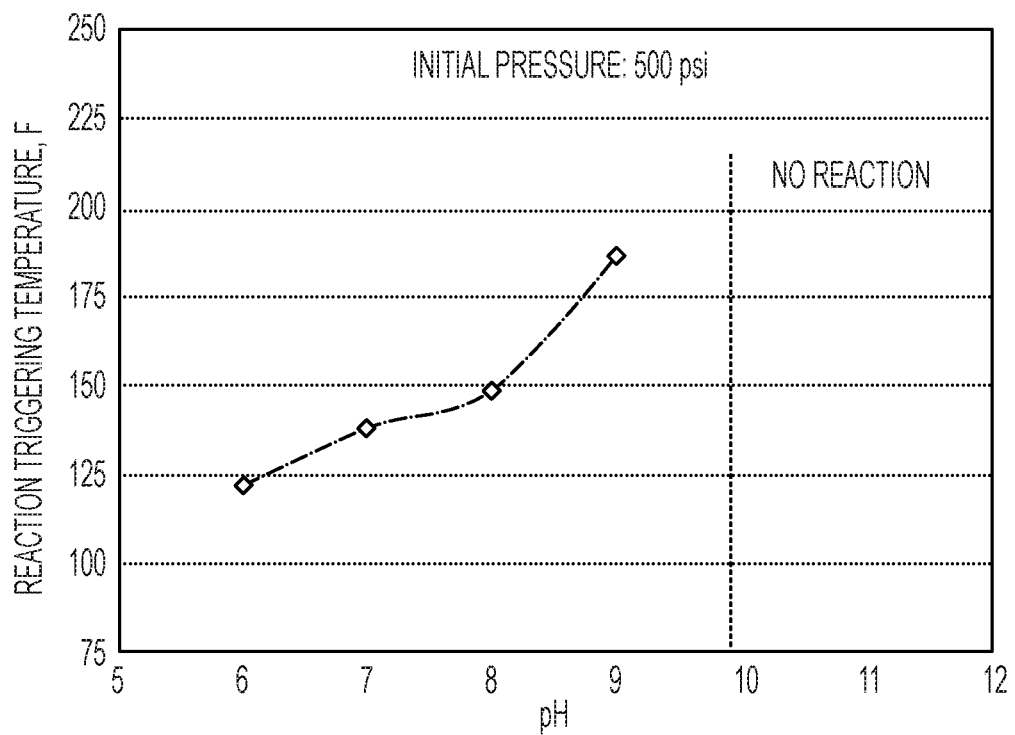
FIG. 6 is a graph showing effect of pH on the reaction initiation temperature.

The pH of the treatment solution also may affect the initiation temperature of Reaction 1. With reference to FIG. 6, the effect of pH on the initiation temperature of Reaction 1 is shown at a reservoir pressure of 500 psi. At that pressure, an increase in the pH results in a corresponding increase in the initiation temperature of Reaction 1. At a pH of 6 the initiation temperature of Reaction 1 is approximately 122° F. (50° C.), at a pH of 8 the initiation temperature of Reaction 1 is approximately 150° F. (65.6° C.), and at a pH of 9 the initiation temperature of Reaction 1 is approximately 182° F. (83.3° C.). As such, the pH of the treatment solution may be adjusted for the specific temperature and pressure conditions of each reservoir to allow for positioning of the treatment solution within the formation before Reaction 1 progresses. In various embodiments, the pH may be in the range of 6 to 10, 6 to 9, 7 to 8, 8 to 9, 6 to 8, or 7 to 9 to account for distinct downhole pressures and temperatures unique to each well.

In another embodiment, at least the ammonium containing compound and the nitrite containing compound of the treatment fluid are provided with a buffer in a buffer solution. The buffer solution may be injected into a sandstone formation in a hydraulic fracturing procedure. The buffer may be soluble and compatible with the ammonium containing compound and the nitrite containing compound, and the resulting reaction products. The buffer degrades and releases acid within the formation reducing the pH to less than a reaction initiation threshold pH. Specifically, the buffer may release acidic hydrogen ions to reduce the pH of the buffer solution over time such that the injected fluids have time to enter into the formation, and migrate into the fractures created by the hydraulic fracturing process before the pH is reduced to less than the reaction initiation threshold pH. The reaction initiation threshold pH represents the pH at which reaction between the ammonium containing compound and the nitrite containing compound occurs at the present temperature and pressure. In one or more embodiments, the reaction initiation threshold pH is less than about 7.0 for a reservoir pressure of 500 psi and a reservoir temperature of approximately 135° F. (57.3° C.). It will be appreciated that the reaction initiation threshold pH may vary based on the reservoir temperature, the reservoir pressure, or both. Example buffers can include acetates, including methyl acetates and ethyl acetates. At typical formation temperatures of 100 to 350° F., methyl acetate degrades and releases acetic acid. This takes place inside the formation after injection of the fluids. In certain embodiments, approximately 5% by volume of the buffer as a 0.1 molar solution may be included with the ammonium containing compound and the nitrite containing compound.

It will be appreciated that the initiation temperature of Reaction 1 is approximately 500° F. (260° C.) at a pH of 10 allowing for triggering progression of Reaction 1 based on adjustments to only the pH. Specifically, at typical formation temperatures of 100 to 350° F., utilization of a treatment solution having an initial pH greater than 10 ensures Reaction 1 does not proceed until the buffer degrades to generate a pH of the treatment solution less than the reaction initiation threshold pH.

In one or more embodiments, at least one of the ammonium containing compound and the nitrite containing compound is encapsulated with an erodible coating. The erodible coating sequesters the ammonium containing compound, the nitrite containing compound, or both, such that they are unable to react in accordance with Reaction 1 before removal or erosion of the erodible coating. Suitable encapsulation materials for the erodible coating can include hydrated polymers, such as guar, chitosan, and polyvinyl alcohol. In certain embodiments, the previously noted hydrated polymer encapsulation materials may be used as the encapsulant for the nitrite containing compound, such as sodium nitrite. In alternate embodiments, binders, such as carboxymethyl cellulose or xanthan, can be used as an encapsulant. In certain embodiments, the carboxymethyl cellulose or xanthan may be the encapsulant for the ammonium containing compound, such as ammonium chloride. The heat of the formation, presence of acid, or presence of water may all play a role in the erosion or degradation of the encapsulating material, thereby releasing the reactants.

The material of the erodible coating and the thickness of the erodible coating each affect the delay in releasing the reactants for Reaction 1 downhole. Specifically, the speed of removal of the erodible coating determines the timing of the availability of both the ammonium containing compound and the nitrite containing compound for reaction. A thicker erodible coating would naturally require a longer period of time in an erosive environment before penetration, dissipation, and removal of the erodible coating from the ammonium containing compound or the nitrite containing compound. Similarly, differing the distinct materials forming the erodible coating would provide different time horizons in each erosive environment before availability of the ammonium containing compound and the nitrite containing compound for reaction in accordance with Reaction 1. Specifically, the water solubility or heat degradation, for example, of carboxymethyl cellulose and polyvinyl alcohol may be distinct allowing for tuning of the time delay before progression of Reaction 1.

The extent of application of the erodible coating may also affect the progression of Reaction 1. In one or more embodiments, 30 to 100 weight percent (wt. %) of one or more of the ammonium containing compound and the nitrite containing compound are encapsulated. In various embodiments, 40 to 95 wt. %, 50 to 90 wt. %, or 60 to 85 wt. % of one or more of the ammonium containing compound and the nitrite containing compound are encapsulated. The greater the percentage of the one or more of the ammonium containing compound and the nitrite containing compound which are encapsulated, the slower Reaction 1 will progress as the reaction is limited by the availability of reactants. Specifically, when 100 wt. % of one or more of the ammonium containing compound and the nitrite containing compound are encapsulated, the reaction rate of Reaction 1 is limited by the erosion rate of the erodible coating and the commensurate rate of availability of the ammonium containing compound and the nitrite containing compound. Conversely, when 30 wt. % of one or more of the ammonium containing compound and the nitrite containing compound are encapsulated Reaction 1 may progress with 70 wt. % of the reactants and is only limited with the remaining 30 wt. %.

Adjusting the parameters of the erodible coating allows the treatment fluid to be tunable to specific reservoir conditions. A delay as determined by the specific well conditions may be created before availability of reactions for Reaction 1. For example, a delay of 3 to 12 hours may be achieved to allow sufficient time for the treatment fluid to be placed downhole and deep within a horizontal well before generation of HF and associated interaction with the sandstone formation to remove silica and silicate minerals.

The concentration of HF at the sandstone formation affects the rate of silica and silicate mineral removal. The HF dissolves silica and silicate minerals, such as aluminosilicate, while HCl or other strong mineral acid helps keep the reaction products soluble in the spent solution. As the HF is generated in-situ at the site of the sandstone formation the HF does not undergo a potency decrease as a result of interaction with other species during the transfer from the surface to the sandstone formation. In one or more embodiments, the concentration of HF at the sandstone formation is from 0.5 to 10 wt. %. In various further embodiments, the concentration of HF at the sandstone formation is from 0.8 wt. % to 8 wt. %, 0.9 wt. % to 5 wt. %, or 1 wt. % to 3 wt. %.

Generation of HF downhole removes the need for handling HF at the surface of the wellbore allowing for a greater concentration of HF without the associated handling risks. Further, generation of HF in-situ alleviates exposure of the drill string components to the HF during transit downhole allowing for greater concentrations of HF at the sandstone formation without the increased corrosion risks from HF exposure.

Reaction of the HF with the silica and silicate materials results in the HF being spent before flowback into the wellbore. After stimulation operations the resulting slurry of the spent HF and the removed silica/silicate present downhole must be removed from the wellbore. In one or more embodiments, the slurry is squeezed back into the formation for retention and disposal. In further embodiments, the slurry is pumped from the wellbore and flowed to a pit at the surface for retention, processing, and disposal. Any solids generated during the formation stimulation operation may be removed during the stimulation operation through the motive lifting force of generated nitrogen gas produced by the reaction of the nitrite containing compound and the ammonia containing compound in Reaction 1.

The methods and compositions of the present disclosure may also be applied to deep carbonate formation stimulation in hydrocarbon reservoirs. Specifically, in deep carbonate formation stimulation, calcite ($CaCO_3$) and dolomite ($CaMg(CO_3)_2$) are removed from the deep carbonate formation to allow flow of trapped hydrocarbon reserves. The calcite and dolomite may be removed with carbonite acidizing where HCl is reacted with the calcite and dolomite. It will be appreciated that Reaction 3 of the present disclosure provides HCl in-situ and thus may be used for deep carbonate formation stimulation. Specifically, the ammonium containing compound, the nitrite containing compound and the oxidizer may each be provided to allow Reactions 1 and 3 to progress and generate HCl. In-situ and delayed production of HCl in accordance with Reaction 3 allows for deeper carbonate formation stimulation in each fracture than traditional methods of providing HCl from the surface as the HCl is not fully reacted and spent before reaching deep fractures.

It will be appreciated that the present methods and compositions may simultaneously stimulate sandstone formations and deep carbonate formations in a single procedure. This is advantageous in operations with both sandstone and carbonate formations.

EXAMPLES

Testing was completed to verify the progression of Reaction 2 and generation of HF. An aqueous solution of 0.5 grams (g) sodium bromate and 0.5 g of ammonium fluoride in 25 milliliters (ml) of water was prepared. The aqueous solution was placed in a 125 ml autoclave reactor and an initial pH of the aqueous solution was measured. The autoclave reactor was sealed and placed in an oven at 150° C. for 8 hours (h). The autoclave reactor was then cooled to room temperature and a final pH was measured. It was determined that the pH of the aqueous solution dropped to 5, indicating the formation of acid.

Figure 7:
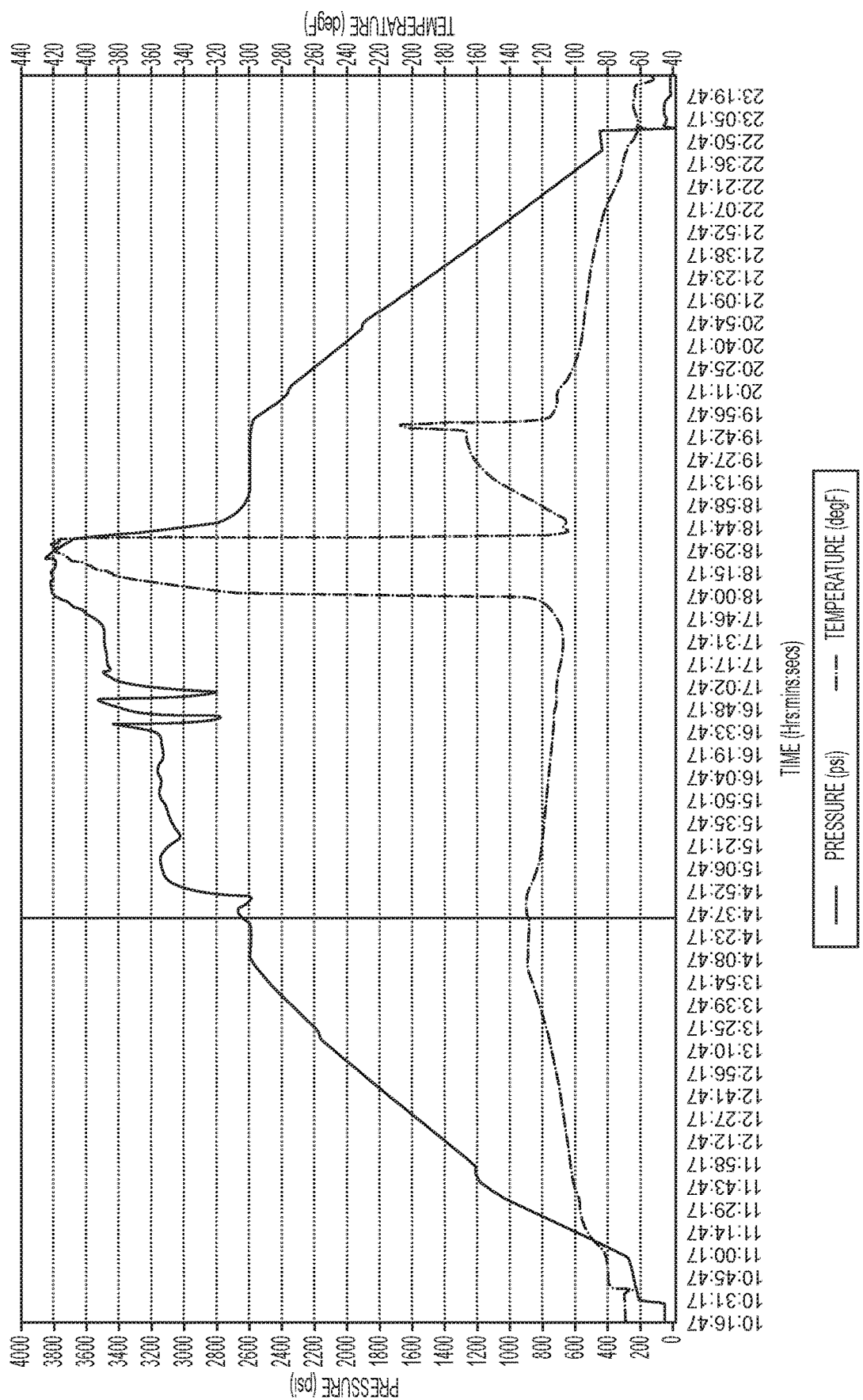
FIG. 7 is a graph showing generated heat and pressure downhole from the exothermic reaction of Reaction 1.

Having demonstrated feasibility of Reaction 2 for the generation of HF, a field test of Reaction 1 for the generation of heat and pressure was completed. Sodium nitrite and ammonium chloride, in accordance with Reaction 1, were pumped separately downhole and into the formation. Specifically, sodium nitrite was pumped through the coiled tubing of the drilling string and ammonium chloride was pumped through the annulus of the drilling string. With reference to FIG. 7, the downhole pressure increased from approximately 2600 psi to approximately 3800 psi after injection of the reactants and initiation of Reaction 1 to generate nitrogen gas (approximately 14:37:47). The pressure was measured with a gauge positioned at the wellhead. Similarly, the downhole temperature increased from approximately 100° F. (37.8° C.) to approximately 420° F. (215.6° C.) after injection of the reactants and initiation of Reaction 1 to generate heat in the exothermic reaction. The temperature was measured with a gauge positioned within the wellbore at the well bottom.

With continued reference to FIG. 7, it is noted that there is an approximately 3 hour delay between injection of the reactants and the spike in temperature. The approximately 3 hour delay is attributed to the experimental protocol where the sodium nitrite and ammonium chloride were continuously squeezed into the formation for the first 3 hours after injection. During the period where the sodium nitrite and ammonium chloride were squeezed into the formation, Reaction 1 was proceeding deep within fractures and microfractures of the formation away from the temperature gauge in the wellbore and as such the temperature gauge was unable to measure the temperature increase of the solution within the formation. Upon completion of the pumping of the fluid with the reactions into the formation, the fluid was able to backflow. The backflowing fluid, having been heated for up to 3 hours by progressing Reaction 1 during the period of squeezing into the formation, returns to the wellbore and the temperature gauge in a hot state.

Upon completion of Reaction 1 to generate heat within the formation, the products and residual reactants were displaced with water pumped into the formation. Upon termination of pumping, flowback occurred from the formation of the heated fluid generating a second peak in temperature in FIG. 7.

It should now be understood the various aspects of the method and associated treatment fluid for stimulating production of hydrocarbons from a sandstone formation are described and such aspects may be utilized in conjunction with various other aspects.

In a first aspect, the disclosure provides a method for stimulating production of hydrocarbons from a sandstone formation. The method comprises the steps of: injecting a stimulation fluid into the sandstone formation, the stimulation fluid comprising a hydrofluoric acid precursor and an oxidizer; injecting an ammonium containing compound into the sandstone formation; injecting a nitrite containing compound into the sandstone formation; maintaining the stimulation fluid, the ammonium containing compound, and the nitrite containing compound in the sandstone formation. The stimulation fluid, the ammonium containing compound, and the nitrite containing compound are maintained in the sandstone formation to initiate reaction of the ammonium containing compound and the nitrite containing compound to generate heat and nitrogen gas, where upon generation of heat within the formation the hydrofluoric acid precursor and the oxidizer react to form hydrofluoric acid in-situ, and dissolve silica and silicate minerals to stimulate the sandstone formation.

In a second aspect, the disclosure provides the method of the first aspect, in which the hydrofluoric acid precursor comprises $NH_4F$.

In a third aspect, the disclosure provides the method of the first or second aspects, in which the oxidizer comprises sodium bromate.

In a fourth aspect, the disclosure provides the method of any of the first through third aspects, in which the nitrite containing compound comprises $NaNO_2$.

In a fifth aspect, the disclosure provides the method of any of the first through fourth aspects, in which the ammonium containing compound comprises $NH_4Cl$.

In a sixth aspect, the disclosure provides the method of any of the first through fifth aspects, in which a first solution comprising the hydrofluoric acid precursor, the oxidizer, and the ammonium containing compound and a second solution comprising the nitrite containing compound are provided downhole separately.

In a seventh aspect, the disclosure provides the method of any of the first through fifth aspects, in which the hydrofluoric acid precursor, the oxidizer, the ammonium containing compound, and the nitrite containing compound are mixed together before being pumped downhole for injection into the sandstone formation as one solution.

In an eighth aspect, the disclosure provides the method of any of the first through sixth aspects, in which the first solution or the second solution is provided downhole through a coiled tubing of the drilling string and the other of the first solution or the second solution is provided downhole through an annulus of the drilling string.

In a ninth aspect, the disclosure provides the method of any of the first through fifth aspects, in which the hydrofluoric acid precursor and the oxidizer are injected into the sandstone formation as a first injection and subsequently the nitrite containing compound is injected into the sandstone formation as a second injection. The ammonium containing compound is provided with one or both of the first injection and the second injection, thereby activating the reaction of the ammonium containing compound and the nitrite containing compound to generate heat and activate the stimulation fluid to generate hydrofluoric acid in-situ.

In a tenth aspect, the disclosure provides the method of any of the first through ninth aspects, in which at least one of the ammonium containing compound and the nitrite containing compound are encapsulated with an erodible coating such that reaction between the ammonium containing compound and the nitrite containing compound is delayed.

In an eleventh aspect, the disclosure provides the method of the tenth aspect, in which at least one of the ammonium containing compound and the nitrite containing compound is encapsulated in a polymer coating.

In a twelfth aspect, the disclosure provides the method of tenth or eleventh aspects, in which at least 30 percent by weight of one or more of the ammonium containing compound and the nitrite containing compound are encapsulated.

In a thirteenth aspect, the disclosure provides the method of any of the first through twelfth aspects, in which at least the ammonium containing compound and the nitrite containing compound are provided in a buffer solution that releases acidic hydrogen ions and reduces the pH of the buffer solution to less than a reaction initiation threshold pH to initiate reaction between the ammonium containing compound and the nitrite containing compound.

In a fourteenth aspect, the disclosure provides the method of the thirteenth aspect, in which the reaction initiation threshold pH is 7.0.

In a fifteenth aspect, the disclosure provides the method of the fifth aspect, in which the oxidizer and the $NH_4Cl$ react to form HCl.

In a sixteenth aspect, the disclosure provides the method of the fifteenth aspect, in which the method further comprises injecting ammonium bifluoride into the sandstone formation, the ammonium bifluoride reacting with HCl to form HF.

In a seventeenth aspect, the disclosure provides a treatment fluid for use in stimulating sandstone formations. The treatment fluid comprises a stimulation fluid, the stimulation fluid comprising a hydrofluoric acid precursor and an oxidizer, an ammonium containing compound, and a nitrite containing compound. The ammonium containing compound and the nitrite containing compound are operable to react and generate heat and nitrogen gas and the hydrofluoric acid precursor and the oxidizer react are operable to react to form hydrofluoric acid.

In an eighteenth aspect, the disclosure provides the treatment fluid of the seventeenth aspect, in which the hydrofluoric acid precursor comprises $NH_4F$, the oxidizer comprises sodium bromate, the nitrite containing compound comprises $NaNO_2$, and the ammonium containing compound comprises $NH_4Cl$.

In a nineteenth aspect, the disclosure provides the treatment fluid of the seventeenth or eighteenth aspects, in which at least one of the ammonium containing compound and the nitrite containing compound are encapsulated with an erodible coating such that reaction between the ammonium containing compound and the nitrite containing compound is delayed.

In a twentieth aspect, the disclosure provides the treatment fluid of any of the seventeenth through nineteenth aspects, in which the treatment fluid additionally comprises ammonium bifluoride.

It should be apparent to those skilled in the art that various modifications and variations can be made to the described embodiments without departing from the spirit and scope of the claimed subject matter. Thus, it is intended that the specification covers the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

What is claimed is:

1. A method for stimulating production of hydrocarbons from a sandstone formation, the method comprising the steps of:
    injecting a stimulation fluid into the sandstone formation, the stimulation fluid comprising a hydrofluoric acid precursor and an oxidizer;
    injecting an ammonium containing compound into the sandstone formation;
    injecting a nitrite containing compound into the sandstone formation; and
    maintaining the stimulation fluid, the ammonium containing compound, and the nitrite containing compound in the sandstone formation to:
        initiate reaction of the ammonium containing compound and the nitrite containing compound to generate heat and nitrogen gas, where upon generation of heat within the formation the hydrofluoric acid precursor and the oxidizer react to form hydrofluoric acid in-situ; and
        dissolve silica and silicate minerals to stimulate the sandstone formation.

2. The method of claim 1, where the hydrofluoric acid precursor comprises $NH_4F$.

3. The method of claim 1, where the oxidizer comprises sodium bromate.

4. The method of claim 1, where the nitrite containing compound comprises $NaNO_2$.

5. The method of claim 1, where the ammonium containing compound comprises $NH_4Cl$.

6. The method of claim 5, where the oxidizer and the $NH_4Cl$ react to form HCl.

7. The method of claim 6, further comprising injecting ammonium bifluoride into the sandstone formation, the ammonium bifluoride reacting with HCl to form HF.

8. The method of claim 1, where the hydrofluoric acid precursor, the oxidizer, the ammonium containing compound, and the nitrite containing compound are mixed together before being pumped downhole for injection into the sandstone formation as one solution.

9. The method of claim 1, where a first solution comprising the hydrofluoric acid precursor, the oxidizer, and the ammonium containing compound and a second solution comprising the nitrite containing compound are provided downhole separately.

10. The method of claim 9, where the first solution and the second solution are provided downhole separately through a coiled tubing of a drilling string and an annulus of the drilling string.

11. The method of claim 1, where the hydrofluoric acid precursor and the oxidizer are injected into the sandstone formation as a first injection and subsequently the nitrite containing compound is injected into the sandstone formation as a second injection, where the ammonium containing compound is provided with one or both of the first injection and the second injection, thereby activating the reaction of the ammonium containing compound and the nitrite containing compound to generate heat and activate the stimulation fluid to generate hydrofluoric acid in-situ.

12. The method of claim 1, where at least one of the ammonium containing compound and the nitrite containing compound are encapsulated with an erodible coating such that reaction between the ammonium containing compound and the nitrite containing compound is delayed.

13. The method of claim 12, where at least one of the ammonium containing compound and the nitrite containing compound is encapsulated in a polymer coating.

14. The method of claim 12, where at least 30 percent by weight of one or more of the ammonium containing compound and the nitrite containing compound are encapsulated.

15. The method of claim 1, where at least the ammonium containing compound and the nitrite containing compound are provided in a buffer solution that releases acidic hydrogen ions and reduces the pH of the buffer solution to less than a reaction initiation threshold pH to initiate reaction between the ammonium containing compound and the nitrite containing compound.

16. The method of claim 15, where the reaction initiation threshold pH is 7.0.

* * * * *

UNITED STATES PATENT AND TRADEMARK OFFICE
CERTIFICATE OF CORRECTION

PATENT NO. : 10,961,833 B2  
APPLICATION NO. : 16/412962  
DATED : March 30, 2021  
INVENTOR(S) : Ayman R. Al-Nakhli and Amy J. Cairns Page 1 of 1

It is certified that error appears in the above-identified patent and that said Letters Patent is hereby corrected as shown below:

In the Specification

In Column 2, Line(s) 57, delete "days." and insert --clays.--, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*